United States Patent
Won

(10) Patent No.: US 7,327,798 B2
(45) Date of Patent: Feb. 5, 2008

(54) METHOD AND APPARATUS FOR TRANSMITTING/RECEIVING SIGNALS IN MULTIPLE-INPUT MULTIPLE-OUTPUT COMMUNICATION SYSTEM PROVIDED WITH PLURALITY OF ANTENNA ELEMENTS

(75) Inventor: Seung Hwan Won, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 884 days.

(21) Appl. No.: 10/274,001

(22) Filed: Oct. 21, 2002

(65) Prior Publication Data

US 2003/0076891 A1 Apr. 24, 2003

(30) Foreign Application Priority Data

| Oct. 19, 2001 | (KR) | ................................. 2001-64722 |
| Jan. 4, 2002 | (KR) | ................................. 2002-00417 |
| Oct. 19, 2002 | (KR) | ..................... 10-2002-0064059 |
| Oct. 19, 2002 | (KR) | ..................... 10-2002-0064060 |

(51) Int. Cl.
*H04B 7/02* (2006.01)

(52) U.S. Cl. .................................................... 375/267

(58) Field of Classification Search ............... 375/267, 375/260, 259; 370/334, 332, 331, 329, 328, 370/310; 455/39, 500, 91, 101, 130
See application file for complete search history.

(56) References Cited

U.S. PATENT DOCUMENTS 6,327,299 B1 * 12/2001 Meszko ....................... 375/149

6,536,733 B1 * 3/2003 Sharp ........................ 248/519
6,901,264 B2 * 5/2005 Myr ........................ 455/456.5

FOREIGN PATENT DOCUMENTS

| KR | 2001-0032335 | 4/2001 |
| KR | 1020010062463 | 7/2001 |

OTHER PUBLICATIONS

Foschini, Gerard J., "Layered Space-Time Architecture for Wireless Communication in a Fading Environment When Using Multi-Element Antennas," Autumn 1996, Bell Labs Technical Journal, Lucent Technologies, Inc.

Wolniansky, P.W., G.J. Foschini, G.D. Golden and R.A. Valenzuela, "V-BLAST: An Architecture for Relizing Very High Data Rates Over the Rich-Scattering Wireless Channel," 1998 IEEE.

Chizhik, Dimitry, Farrokh Rashid Farrokhi. Jonathan Ling and Angel Lozano, "Effect of Antenna Separation on the Capacity of BLAST in Correlated Channels," Nov. 2000, IEEE Communications Letters, vol. 4, No. 11.

* cited by examiner

*Primary Examiner*—Pankaj Kumar
(74) *Attorney, Agent, or Firm*—Ked & Associates, LLP

(57) ABSTRACT

A method and apparatus for transmitting/receiving signals in a multiple-input multiple-output communication system provided with a plurality of antenna elements is disclosed. Accordingly, the present invention provides a plurality of antenna groups at one distance having the antenna elements arranged at the other distance, a method in an apparatus for identifying the groups and adding an identifier for the groups. It further provides a method and an apparatus for allocating power for the groups.

17 Claims, 13 Drawing Sheets

METHOD AND APPARATUS FOR TRANSMITTING/RECEIVING SIGNALS IN MULTIPLE-INPUT MULTIPLE-OUTPUT COMMUNICATION SYSTEM PROVIDED WITH PLURALITY OF ANTENNA ELEMENTS

This application claims the benefit of the Korean Application Nos. P01-64722 filed on Oct. 19, 2001, P02-00417 filed on Jan. 04, 2002, P02-64059 filed on Oct. 19, 2002, and P02-64060 filed on Oct. 19, 2002 which are hereby incorporated by reference.

BACKGROUND OF THE INVENTION

1. Field of the Invention

The present invention relates generally to a mobile communication system, and more particularly to a method and an apparatus for transmitting/receiving signals in a multiple-input multiple-output (MIMO) communication system provided with a plurality of antenna elements.

2. Background of the Related Art

Generally, the multiple-input multiple-output (MIMO) system has been evolved from a conventional single-input single-output (SISO) communication system and a single-input multiple-output (SIMO) communication system, and developed so that it is used in a technique that requires a high-capacity data transmission. This MIMO system transmits information through M antennas and receives the information through N antennas, and is considered as an essential element in the fourth-generation communication system that requires a high efficiency of frequency.

FIG. 1 is a diagram illustrating an example of a conventional MIMO system.

Referring to FIG. 1, a transmitter includes a transmission multiple-input multiple-output processor 101 for dividing an information source (or bit stream or data stream) into M sub-bit streams for signal processing, and a modulator 102 for modulating processed signals and applying modulated signals to M antennas. A receiver includes a demodulator 103 for receiving the signals transmitted from the transmitter through N antennas and demodulating the received signals, and a reception multiple-input multiple-output processor 104 for processing and restoring demodulated signals to the original bit stream.

FIG. 2 is a diagram illustrating an example of a transmitter of a conventional D-BLAST MIMO system. FIG. 3 is a diagram illustrating an example of a receiver of a conventional D-BLAST MIMO system.

According to the MIMO system of FIGS. 2 and 3, the distance between antennas is 1.5λ, and four transmission and reception antennas are used. The MIMO system of FIGS. 2 and 3 is of a diagonal-bell labs' layered space-time (D-BLAST) type.

Referring to FIGS. 2 and 3, the bit stream to be transmitted is divided into M sub-bit streams of the same ratio by a demultiplexer 203, and the sub-bit streams are encoded in a signal processor 202. The encoded signals are periodically connected to the respective antennas by a tetrad cyclic shifter 201 to be transmitted to the receiver.

The signal processor 202 generates transmission signals having different transmission delays by modulating and encoding the respective bit streams of one information source, and applies the signals to the respective antennas. The signals transmitted through the antennas include the symbols encoded from the same information.

The cyclic shifter 201 periodically changes the connection of the transmission antennas to the signals processed from the sub-streams. For each τ seconds, the connection between the processed signals and the transmission antennas is periodically changed. This enables the transmitter to use a delay diversity technique, and M processed signals on fading channels are all received through the N receiving antennas. Herein, since the M transmitted signals are received through all the receiving antennas, any one of the transmitted signals is received without being seriously affected by the worst channel environment when it passes through the multiple-paths environment.

Accordingly, the symbols which the received signals include are diagonally detected in respective space layers (discriminated by the receiving antennas) of a detector 301. That is, the desired symbol values are detected through cancelation of previously detected symbols from the received signals and nullification of the non-detected symbols. This process diagonally detects the desired symbol values as many as the number of antennas.

The nullification enables the detection of the strongest signal by removing other weak signals, and the cancelation enables the detection of the remaining weak signals by removing the previously detected signals from the original received signals.

Then, the detected symbols for each antenna are collected by a multiplexer 302, and generated as one data stream in the respective space layer, and the data streams of all the antennas are finally combined in the maximum ratio by a combiner 303.

This maximum ratio combining type is for making the value of an output signal-to-interference ratio maximum by applying the respective channels to gains in proportion to square roots of the signal-to-interference ratios in the respective channels. These signal-to-interference ratios in the respective channels are added together to provide a whole signal-to-interference ratio.

FIG. 4 is a view illustrating another example of a transmitter of a conventional V-BLAST MIMO system. FIG. 5 is a view illustrating an example of a receiver for receiving signals from the transmitter illustrated in FIG. 4.

According to the MIMO system of FIGS. 4 and 5, the distance between antennas is 4λ, and four transmission and reception antennas are used. The MIMO system of FIGS. 4 and 5 is of a vertical-bell labs' layered space-time (V-BLAST) type.

The MIMO system of FIGS. 4 and 5 has a similar construction to that of FIGS. 2 and 3.

However, a signal processor 401 in FIG. 4 simplifies the decoding process by simply performing a vector encoding process for changing a bit to a symbol. The signal processor 401 modulates and encodes a plurality of sub-data streams divided from one information source. That is, M encoded symbols divided from the same information are transmitted through a plurality of antennas, respectively.

Also, a detector 501 arranges the M received symbols in the order of their levels of the signal-to-interference ratio, and detects a desired symbol from the symbols having a good receiving condition among the arranged symbols.

The frequency efficiency of the system used in FIGS. 4 and 5 is lower than that of the MIMO system used in FIGS. 2 and 3, but it can be implemented using a more simplified receiving circuit.

That is, since the transmitted symbols in FIGS. 2 and 3 may suffer a fatal error as passing through a multi-paths environment, an obstacle may arise when the receiver obtains the original information stream from the received symbols. Also, the construction of the receiver is complicated, and the channel coding is applied in a limited manner. However, the efficiency of the frequency use is heightened.

On the contrary, the system as shown in FIGS. 4 and 5 can be implemented using a simplified receiving circuit as an alternative, but the efficiency of the frequency use is degraded, and the distance between antenna elements should be widened. This is because the distance $10\lambda$ should be put between the antennas for no correlation between the antennas, and for practical use, the distance of at least $4\lambda$ should be put between the antennas for no correlation (which corresponds to 80% of the case having no correlation).

Accordingly, it is required to design a MIMO system that improves the advantage of the D-BLAST type system illustrated in FIGS. 2 and 3, and makes up for the weak points in the V-BLAST type system illustrated in FIGS. 4 and 5.

SUMMARY OF THE INVENTION

An object of the present invention is to provide to a method and an apparatus for transmitting/receiving signals in a multiple-input multiple-output (MIMO) communication system provided with a plurality of antenna elements that substantially obviates one or more problems due to limitations and disadvantages of the related art.

Another object of the present invention is to provide a method and an apparatus for transmitting/receiving signals in a multiple-input multiple-output (MIMO) communication system provided with a plurality of antenna elements having a high efficiency of frequency use.

Another object of the present invention is to provide a method and an apparatus for transmitting/receiving signals in a multiple-input multiple-output (MIMO) communication system provided with a plurality of antenna elements so that enables respective antennas to be efficiently arranged in a limited space.

Still another object of the present invention is to provide a method and an apparatus for transmitting/receiving signals in a multiple-input multiple-output (MIMO) communication system provided with a plurality of antenna elements that can be easily implemented.

These and other objects and advantages of the present invention are achieved by providing a method and an apparatus for transmitting/receiving signals in a multiple-input multiple-output (MIMO) communication system provided with a plurality of antenna elements, comprises the steps of dividing the plurality of antenna elements into N groups according to locations of the plurality of antenna elements, dividing a data stream into N sub-data streams including identifiers of the antenna elements of a corresponding group and signal-processing the sub-data streams, transmitting an $i_{th}$ processed sub-data stream to a receiver through each antenna element of an $i_{th}$ group with different transmission delays for i=1, 2, . . . , and N.

According to another aspect of the present invention, a communication method in a multiple-input multiple-output communication system provided with a plurality of antenna elements, comprises the steps of dividing the plurality of transmitting antenna elements into N groups according to locations of the plurality of transmitting antenna elements, dividing a data stream into N sub-data streams including identifiers of the antenna elements of a corresponding group, signal-processing the sub-data streams, transmitting an $i_{th}$ processed sub-data stream to a receiver through each transmitting antenna element of an $i_{th}$ group with different transmission delays for i=1, 2, . . . , and N, receiving the processed sub-data streams which are transmitted, detecting antenna element identifiers of each processed sub-data stream, detecting symbols from the processed $i_{th}$ sub-data stream with different transmission delays and its detected antenna element identifiers for i=1, 2, . . . , and N; and gestoring the data stream by combining the detected symbols.

According to another aspect of the present invention, a method for transmitting signals in a multiple-input multiple-output communication system provided with a plurality of antenna elements, comprises the steps of dividing the plurality of antenna elements into N groups according to locations of the plurality of antenna elements, dividing a data stream into N sub-data streams and signal-processing the sub-data streams, and transmitting an $i_{th}$ processed sub-data stream to a receiver through each antenna element of an $i_{th}$ group with different transmission delays for i=1, 2, . . . , N and transmitting identifiers of the antenna elements of the $i_{th}$ group through a seperate channel.

According to another aspect of the present invention, a communicating method in a multiple-input multiple-output communication system provided with a plurality of antenna elements, comprises the steps of dividing the plurality of antenna elements into N groups according to locations of the plurality of antenna elements, dividing a data stream into N sub-data streams and signal-processing the sub-data streams, transmitting an $i_{th}$ processed sub-data stream to a receiver through each antenna element of an $i_{th}$ group with different transmission delays for i=1, 2, . . . , N and transmitting identifiers of the antenna elements of the $i_{th}$ group through a separate channel, receiving the processed sub-data streams, estimating respective channel vectors of the identifiers, detecting desired symbols by applying nulling vectors of the estimated channel vectors to the processed sub-data streams, respectively, and restoring the data stream by multiplexing the detected symbols.

According to another aspect of the present invention, an apparatus for transmitting signals in a multiple-input multiple-output communication system provided with a plurality of antenna elements, comprises the steps of N groups into which the apparatus divides the plurality of antenna elements according to locations of the plurality of antenna elements, a demultiplexer for dividing a data stream into N sub-data streams including identifiers of the antenna elements of a corresponding group, and signal-processor for signal-processing the sub-data streams, wherein the apparatus transmits an $i_{th}$ processed sub-data stream to a receiver through each antenna element of an $_{th}$ group with different transmission delays for i=1, 2, . . . , and N.

According to another aspect of the present invention, a communication apparatus in a multiple-input multiple-output communication system provided with a plurality of antenna elements, comprises N groups into which the apparatus divides the plurality of transmitting antenna elements according to locations of the plurality of transmitting antenna elements, a demultiplexer for dividing a data stream into N sub-data streams including identifiers of the antenna elements of a corresponding group and signal-processing the sub-data streams, wherein the apparatus transmits an $i_{th}$ processed sub-data stream to a receiver through each transmitting antenna element of an $i_{th}$ group with different transmission delays for i=1, 2, . . . , and N, a first detector for detecting antenna element identifiers of each processed sub-data stream received, a second detector for detecting symbols from the processed $i_{th}$ sub-data stream with different transmission delays and its detected antenna element identifiers for i=1, 2, . . . , and N, and a combiner for combining the detected symbols to restore the data stream.

According to another aspect of the present invention, an apparatus for transmitting signals in a multiple input multiple-output communication system provided with a plurality of antenna elements, comprises N groups into which the apparatus divides the plurality of antenna elements according to locations of the plurality of antenna elements, a demultiplexer for dividing a data stream into N sub-data streams, and a processor for signal-processing the sub-data streams, wherein the apparatus transmits an $i_{th}$ processed sub-data stream to a receiver through each antenna element of an $i_{th}$ group with different transmission delays for i=1, 2, . . . , N and transmits identifiers of the antenna elements of the $i_{th}$ group through a seperate channel.

According to another aspect of the present invention, a communicating apparatus in a multiple-input multiple-output communication system provided with a plurality of antenna elements, comprises N groups into which the apparatus divides the plurality of antenna elements according to locations of the plurality of antenna elements, a demultiplexer for dividing a data stream into N sub-data streams, a processor for signal-processing the sub-data streams; wherein the apparatus transmits an $i_{th}$ processed sub-data stream to a receiver through each antenna element of an $i_{th}$ group with different transmission delays for i=1, 2, . . . , N and transmits identifiers of the antenna elements of the $i_{th}$ group through a separate channel, a channel estimator for estimating respective channel vectors of the identifiers transmitted, a detector for detecting desired symbols by applying nulling vectors of the estimated channel vectors to the processed sub-data streams, respectively, and a multiplexer for multiplexing the detected symbols to restore the data stream.

It is to be understood that both the foregoing general description and the following detailed description of the present invention are exemplary and explanatory and are intended to provide further explanation of the invention as claimed.

Additional advantages, objects, and features of the present invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

BRIEF DESCRIPTION OF THE DRAWINGS

The invention will be described in detail with reference to the following drawings in which like reference numerals refer to like elements wherein.

DETAILED DESCRIPTION OF PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

The present invention suggests a MIMO transmission/reception system that uses a high efficiency of frequency and a narrow transmission antenna distance. Thus, the present invention provides the advantage of the D-BLAST, and simultaneously supplements the disadvantage of the V-BLAST type system.

Figure 1:
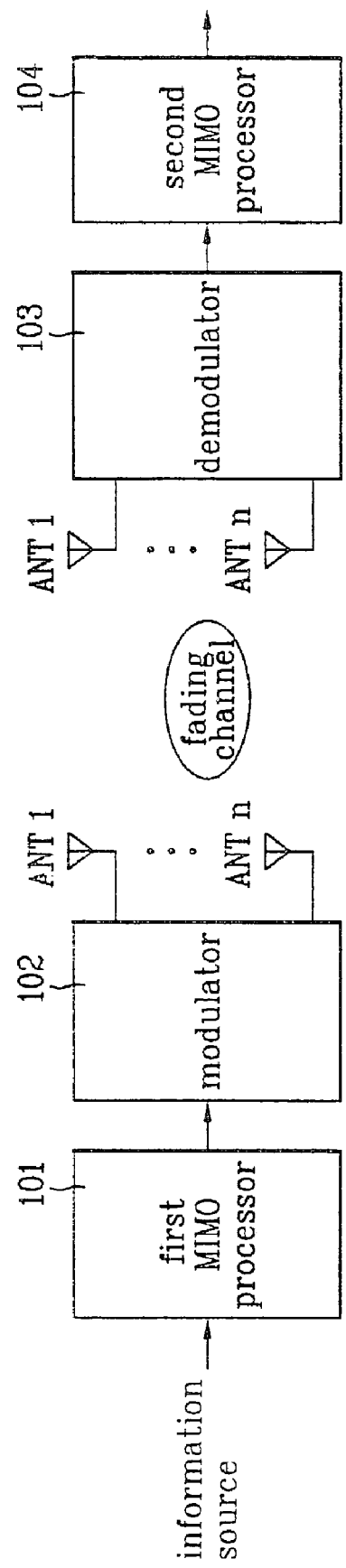
FIG. 1 is a diagram illustrating an example of a conventional MIMO system.
Figure 2:
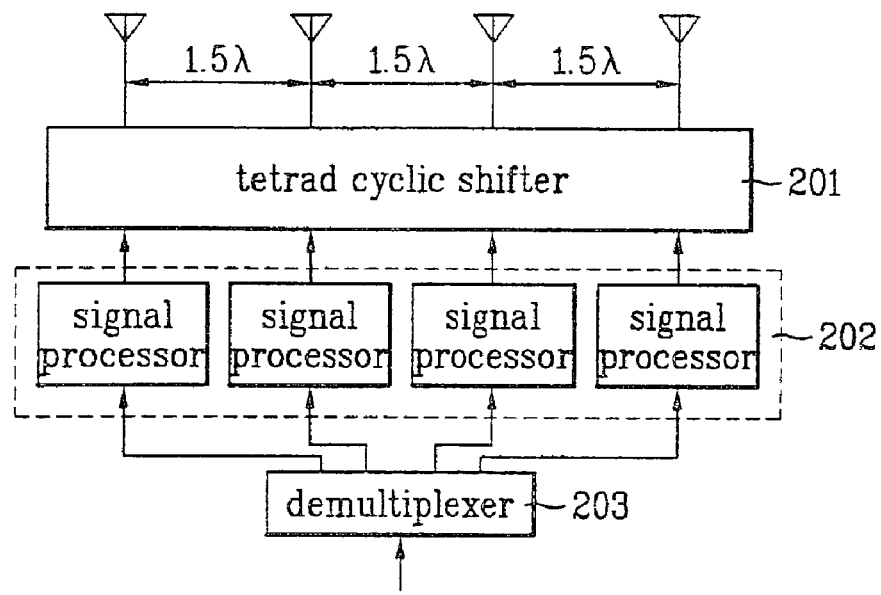
FIG. 2 is a diagram illustrating an example of a transmitter of a conventional D-BLAST MIMO system.
Figure 3:
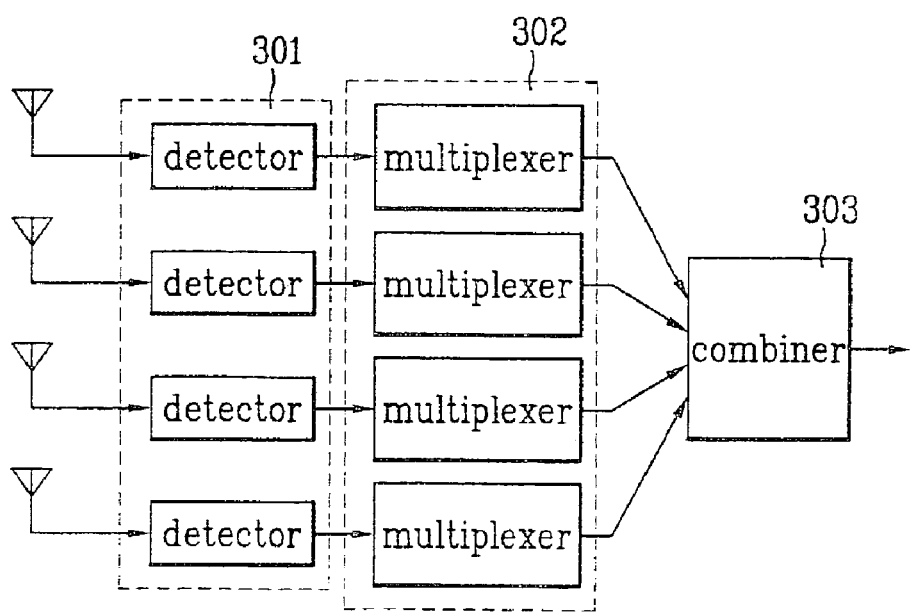
FIG. 3 is a diagram illustrating an example of a receiver for receiving signals from the transmitter illustrated in FIG. 2.
Figure 4:
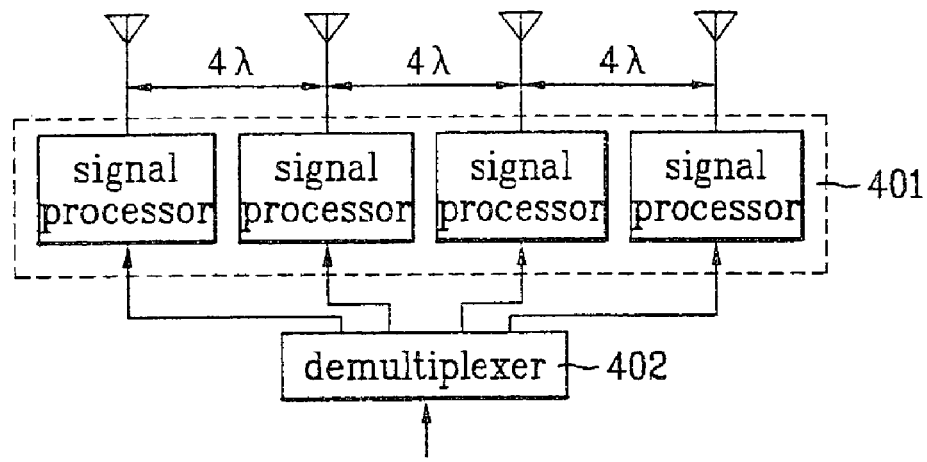
FIG. 4 is a diagram illustrating another example of a transmitter of a conventional V-BLAST MIMO system.
Figure 5:
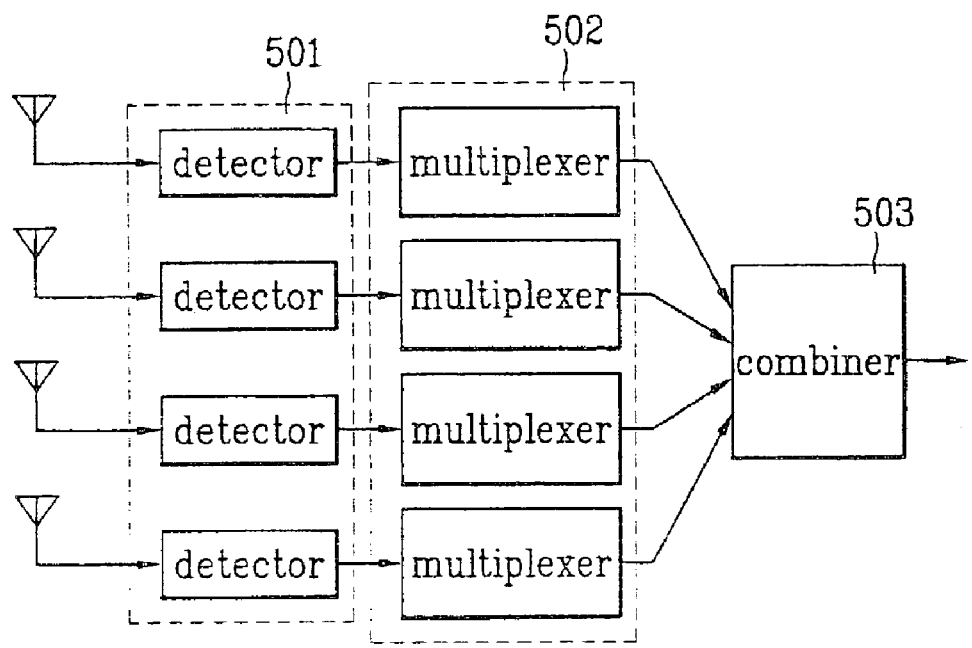
FIG. 5 is a diagram illustrating an example of a receiver for receiving signals from the transmitter illustrated in FIG. 4.
Figure 6:
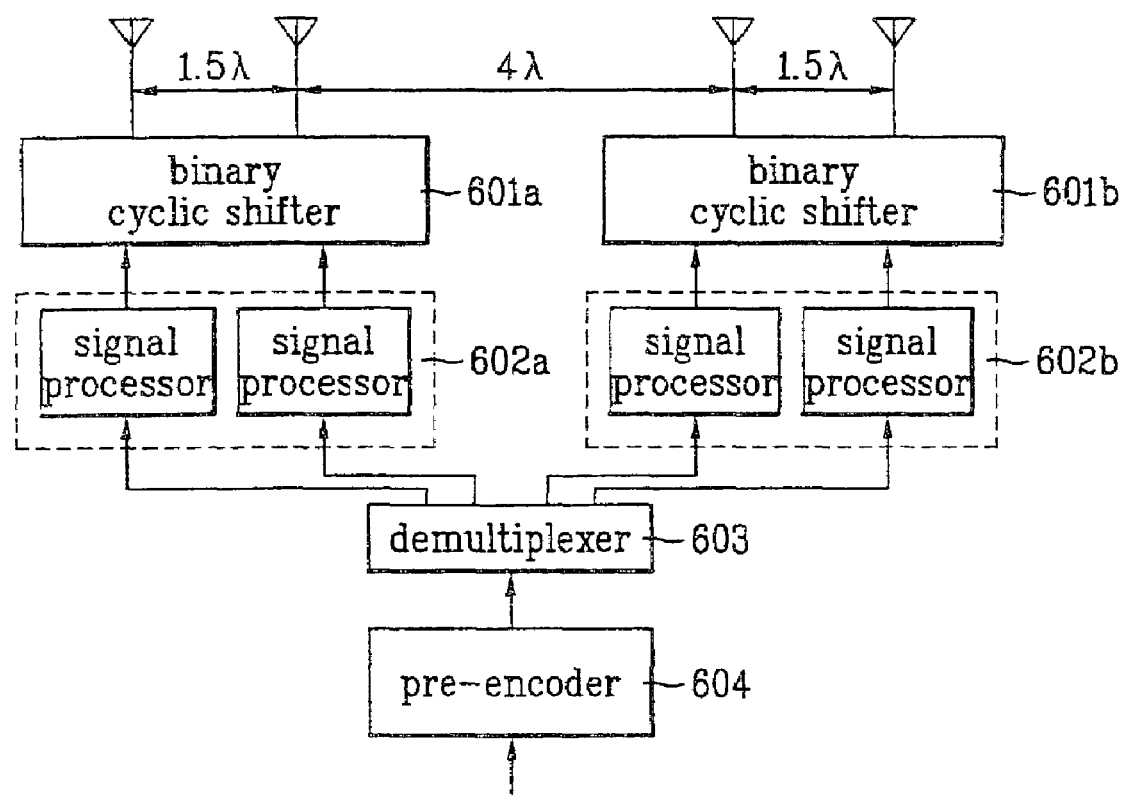
FIG. 6 is a diagram illustrating a transmitter (including four antenna elements) of a MIMO system according to a first embodiment of the present invention.
Figure 7:
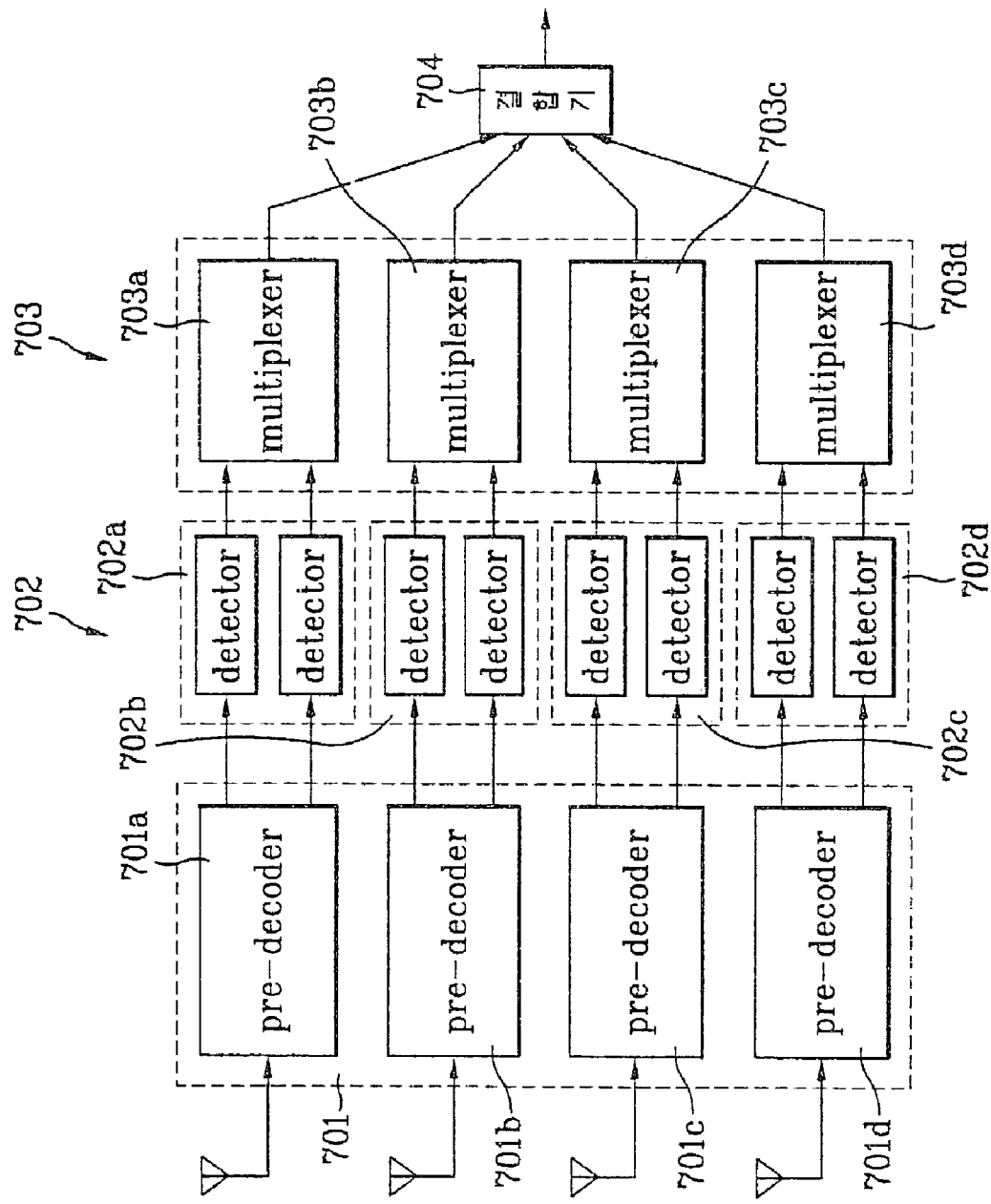
FIG. 7 is a diagram illustrating a first example of a receiver for receiving signals from the transmitter of FIG. 6.

FIG. 6 is a diagram illustrating a transmitter (including four antenna elements) of a MIMO system according to a first embodiment of the present invention. FIG. 7 is a diagram illustrating an example of a receiver for receiving signals from the transmitter of FIG. 6.

In FIGS. 6 and 7 is shown a case that the number of transmission antenna elements is the same as that of reception antennas, for example, four antenna elements are used in total. Also, a D-BLAST transmitter having at least two antenna elements is considered as a constituent unit, and such at least two constituent units constitute a V-BLAST system. That is, a plurality of antenna elements are divided into N constituent units according to locations of the plurality of antenna elements. Herein, a distance between any two antenna elements of each constituent unit is greater than 1.5 times of a wavelength of the transmitting signal. A distance between any two antenna elements that belongs to two constituent units, respectively, is greater than 4 times of a wavelength of the transmitting signal. For example, in FIGS. 6 and 7, the distance between the antenna elements in the D-BLAST system is 1.5λ in the same manner as the conventional system. Also, a D-BLAST transmitter is considered as a constituent unit of the V-BLAST MIMO system, and the antenna distance of a plurality of D-BLAST transmitters that constitute the V-BLAST MIMO system is 4λ in the same manner as the conventional system. That is, in case of arranging four antenna elements to implement the V-BLAST MIMO system, the conventional system requires 12λ, but the system according to the present invention requires 7λ only.

Referring to FIG. 6, a pre-encoder 604 adds a header or an indicator for discriminating antenna elements of the D-BLAST constituent unit to an input data stream at its regular intervals. The header or the indicator is used for discriminating the respective antenna elements of D-BLAST units of the transmitter when a receiver receives signals through the receiving antenna elements. For example, the pre-encoder 604 adds a header or an indicator to each of the M sub-data streams divided from the data stream. At this time, the transmitter doesn't use a separate pilot channel when transmitting the data stream, but pilot symbols the header includes. The receiver receiving the signals generated from the sub-data streams detects the respective headers of the received signals and knows an antenna element through which a corresponding signal is transmitted.

A demultiplexer 603 divides the data stream into M sub-data streams including the headers or indicators respectively, and provides the divided sub-data streams to signal processors 602a and 602b. Herein, M corresponds to a number of the D-BLAST constituent units. At this time, each signal processor 602a and 602b is provided with one or at least two sub-data streams including same information. The two signal processors 602a and 602b arranged in parallel encode and modulate the provided sub-data streams.

Each binary cyclic shifter 601a and 601b shifts the M/2 modulated signals in the same D-BLAST constituent unit to the respective antenna elements to transmit the signals to the receiver. For example, the shifter 601a or 601b shifts the M/2 modulated signals in the same D-BLAST constituent unit per 1 symbol interval. Therefore, the M/2 modulated signals in the same D-BLAST constituent unit includes same information, different transmission delays, and different pilot symbols.

Figure 8:
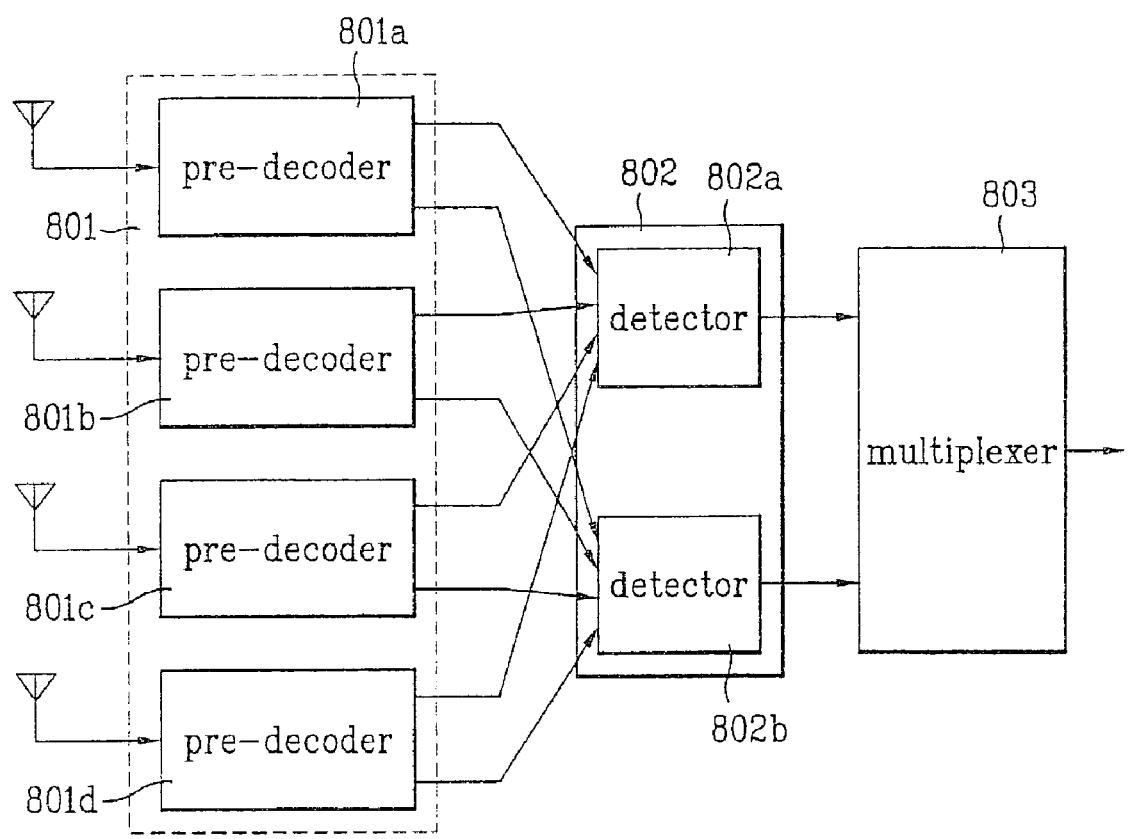
FIG. 8 is a diagram illustrating a second example of a receiver for receiving signals from the transmitter of FIG. 6.

FIGS. 7 and 8 are diagrams illustrating embodiments of a receiver for receiving signals from the transmitter of FIG. 6.

Referring to FIG. 7, for example, each of pre-decoders 701 detects the headers or identifiers of signals received through the antenna elements. For the process, the pre-decoder detects a channel vector of each of the received signals. A nulling vector of the channel vector is used to null undesired symbols (interference and noise signal) of the received signals. A pre-decoder 701a provides the detected channel vector and the corresponding received signal to coupled detectors 702a. At least two adjacent detectors 702a correspond to a number of the constituent units. The adjacent detectors 702a detect desired symbols from the received signals for each of the constituent units. The symbols detected by the adjacent detectors 702a are provided to a same multiplexer 703a. Accordingly, the symbol sequences provided from the respective multiplexers 703 are combined into one symbol sequence in the maximum ratio by a combiner 704. For example, if one of the detectors 702a detects x0, the other does y0, the multiplexer 703a generates a symbol sequence x0y0. Each of other pre-decoders 702b 702c, and 702d and each of other coupled multiplexer 703b, 703c, and 703d generate a symbol sequence x1y1 performing the same procedure. Accordingly, symbols sequences x0y0 and x1y1 provided from all multiplexers 703 are combined into one symbol sequence xy in the maximum ratio by the combiner 704.

Referring to FIG. 8, for another example, a pre-decoder 801a recognizes the headers or identifiers of signals received through the antenna elements. For the process, the pre-decoder 801a estimates a channel vector of each of the received signals. A nulling vector of the channel vector is used to null undesired symbols (interference and noise signal) of the received signals. The pre-decoder 801a provides the estimated channel vector and the corresponding received signal to coupled detector 802a or 802b according to a type of the channel vector. Likewise, other pre-decoders 801b, 801c, and 801c do the same according to a type of the channel vector. Accordingly, signals from transmitting antenna elements of a same constituent unit are provided to a same detector. Each of detectors 802a and 802b sequentially detects desired symbols using the channel vector and the received signals. For example, one detector 802a detects x0 and x1 using the channel vectors and received signals provided by the pre-decoders 801. The detector 802a combines the x0 and x1 in the maximum ratio and outputs x. The other detector 802b detects y0 and y1 using them. The detector 802b combines the y0 and y1 in the maximum ratio and outputs y. A multiplexer 803 multiplexes the x and y in one symbol sequence xy.

Figure 9:
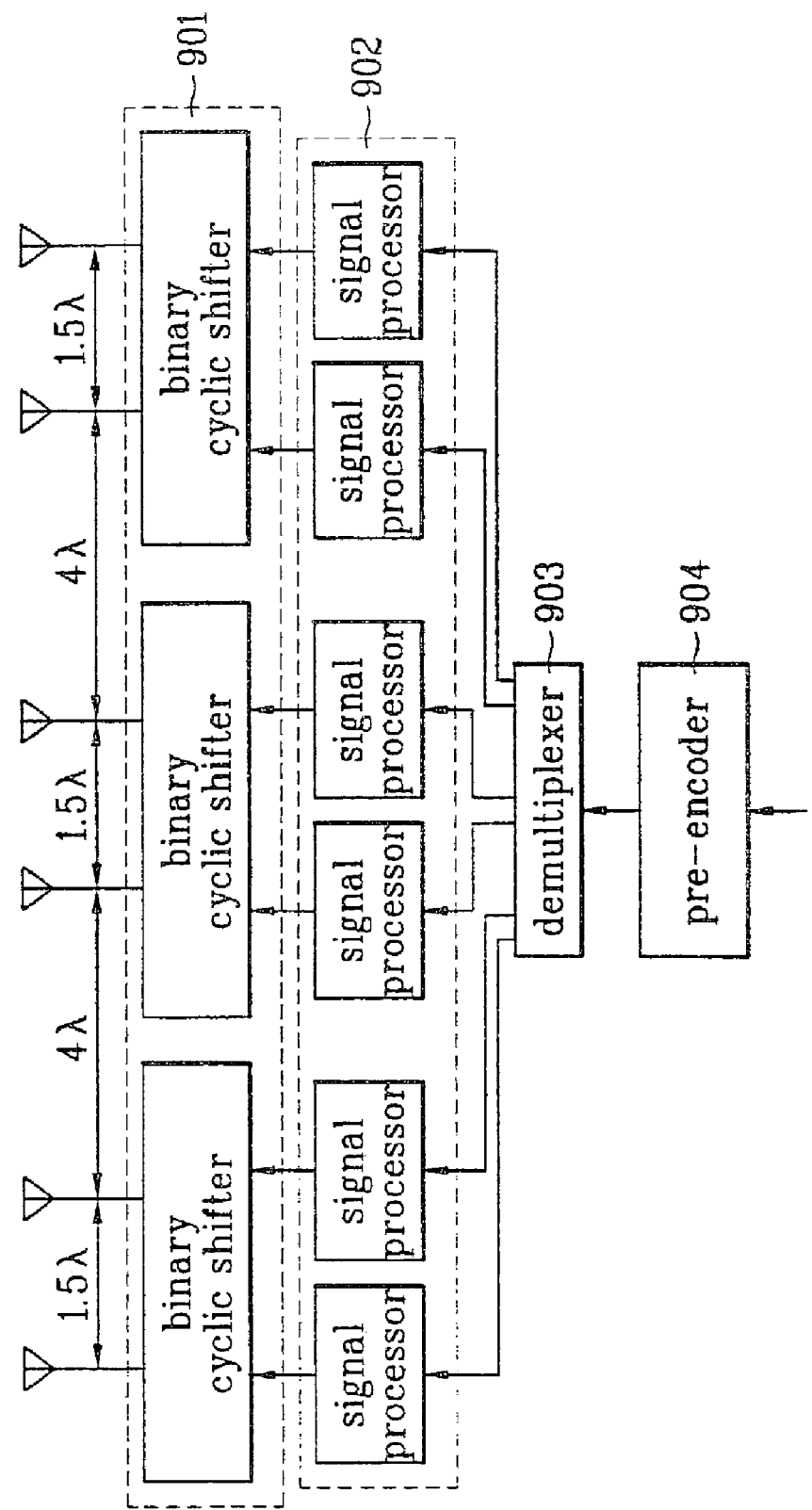
FIG. 9 is a diagram illustrating a transmitter (including six antennas) of a MIMO system according to a second embodiment of the present invention.

FIG. 9 is a diagram illustrating a transmitter (including six antenna elements) of a MIMO system according to a second embodiment of the present invention.

Referring to FIG. 9, the transmission operation of the MIMO system having the odd-numbered D-BLAST constituent units is performed in the same manner as the system of FIG. 6.

Figure 10:
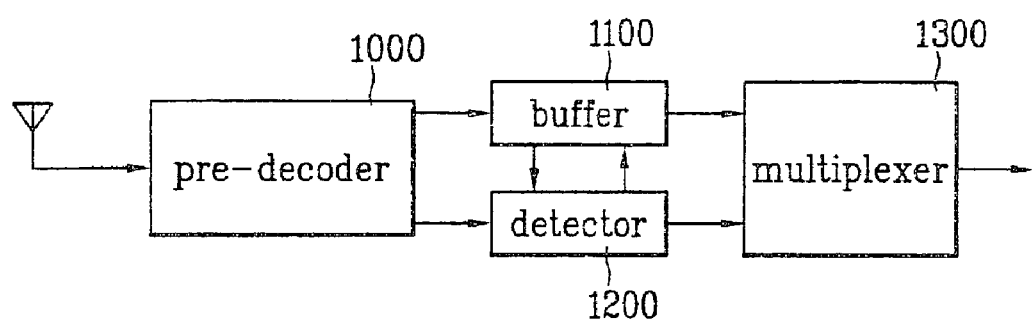
FIG. 10 is a diagram illustrating a first example of a receiver for receiving signals from the transmitter of FIG. 9.
Figure 11:
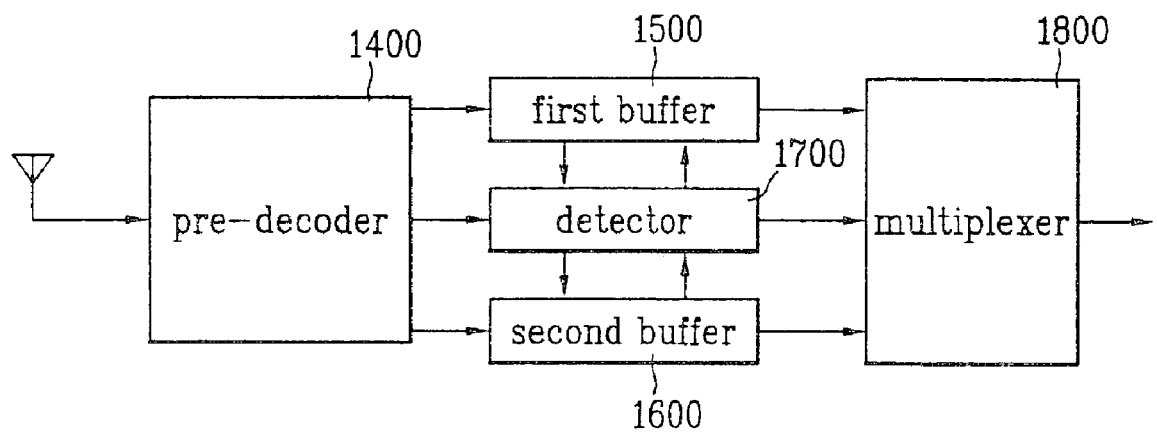
FIG. 11 is a diagram illustrating a second example of a receiver for receiving signals from the transmitter of FIG. 9.
Figure 12:
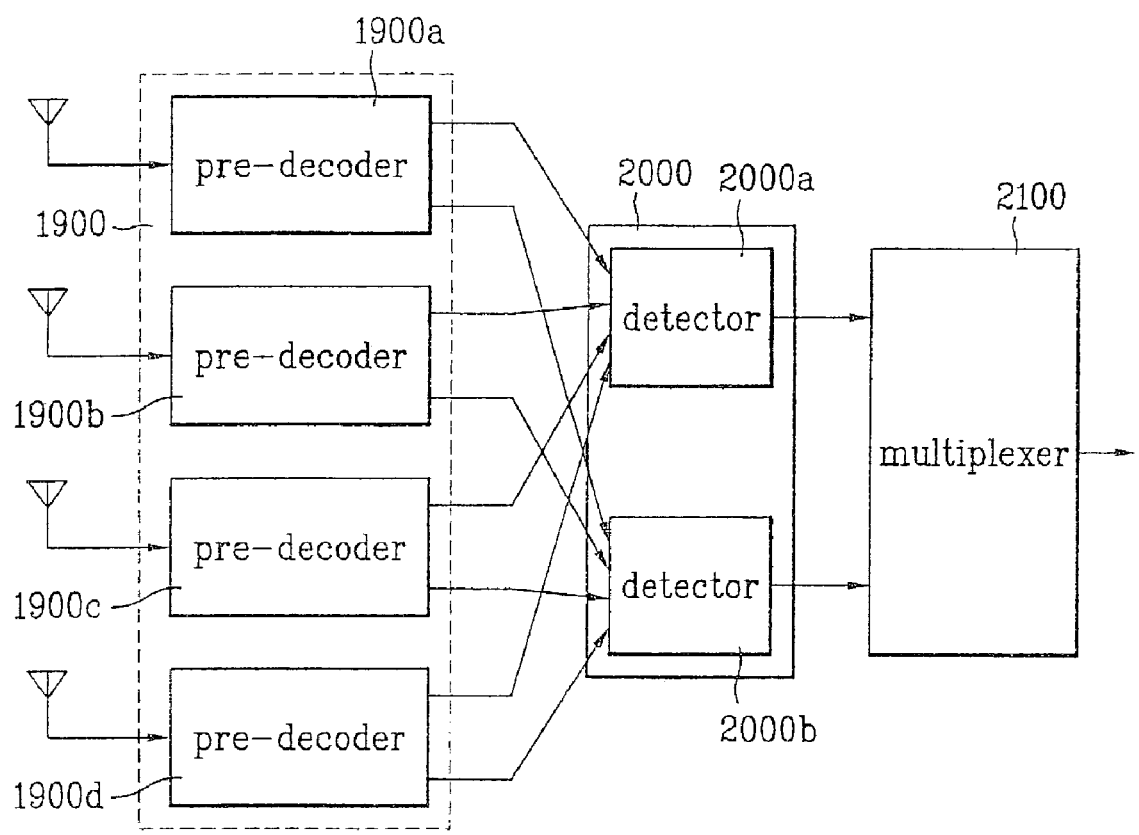
FIG. 12 is a diagram illustrating a third example of a receiver for receiving signals from the transmitter of FIG. 9.

FIGS. 10, 11, and 12 are diagrams illustrating embodiments of a receiver for receiving signals from the transmitter of FIG. 9.

In FIGS. 9 and 12 is shown a case that the number of transmission antenna elements is the same as that of reception antenna elements (six antenna elements in total), and the number of D-BLAST constituent units is an odd number. Since the hardware complexity is increased as the number of D-BLAST constituent units becomes greater, there is provided one D-BLAST receiver for the D-BLAST constituent units.

Especially, the receiver of FIGS. 10, 11, and 12 is proposed from the viewpoint of reducing the complexity of the receiver by reducing the number of D-BLAST detectors even if a more time delay arises where the transmission antenna elements are increasing. This receiver can be applied when the MIMO system is used indoors and the mobility is quite minute. Also, it can be applied when a wireless local loop (WLL) is used outdoors.

Referring to FIG. 10, a pre-decoder 1000 estimates respective channel vectors of the received signals. Some portions of the channel vectors and their received signals are stored in a buffer 1100, others are provided to a detector 1200. The detector 1200 detects desired symbols using the provided channel vectors and their received signals and provides the detected symbols to the buffer 1100. The detector 1200 detects desired symbols using the stored channel vector and their received signals. Such a detection of the symbols and a storage of the detected symbols are not repeated until the detector 1200 detects desired symbols from all the received signal. Symbols having different transmission delays and same information among the detected symbols (currently detected symbols and previously detected and stored symbols) are combined into one symbol in the maximum ratio and are provided to the buffer 1100. A plurality of currently and previously combining symbols are simultaneously provided to a multiplexer 1300. The multiplexer 1300 multiplexes the provided combining symbols as one symbol sequence. For example, the detector 1200 subsequently detects symbols x0, x1, y0, and y1 and combines them into respective symbols x and y in the maximum ratio. The detector 1200 provides the x and y to the buffer 1100. Likewise, the detector 1200 subsequently detects symbols z0 and z1 and combines them into one symbol z. The x, y, and z are simultaneously provided to the multiplexer 1300. The multiplexer 1300 multiplexes the x, y, and z as one symbol sequence. That is, some signals from antenna elements of one constituent unit among the received signals are stored by the buffer 1100 while others from another constituent unit are used to detect the desired symbols.

Or, referring to FIG. 11, there is provided two first and second buffers 1500 and 1600 connected to a D-BLAST detector 1700. Some portions of the estimated channel vector and its received signals are stored by each of the buffers 1500 and 1600 according to a type of the channel vectors, others having another type of the channel vector are provided to a detector 1700. At this time, the types of the channel vectors are determined based on a same constituent unit in a transmitter. The detector 1700 detects desired symbols using the provided channel vectors and their received signals and provides the detected symbols to one of the buffers 1500 and 1600. Thereafter, symbols detected from signals which are stored by the first buffer 1500 are stored by the second buffer 1600, and they vice versa. The last detected symbols are not stored by a buffer, directly provided to a multiplexer 1800 with the previously detected and stored symbols. For example, the detector 1700 first detects symbols x0 and x1, which combines into symbol x in the maximum ratio. The x is stored by the first buffer 1500 or second buffer 1600. The detector 1700 detects symbols y0 and y1 from signals which are stored by the first buffer 1500, which combines into symbol y in the maximum ratio. The y is stored by the second buffer 1600. The detector 1700 detects symbols z0 and z1 from signals which are stored by the second buffet 1600, which combines into symbol z in the maximum ratio. The z is directly provided to the multiplexer 1800 with the x and y without being stored by a buffer. The multiplexer 1800 multiplexes the x, y, and z as one symbol sequence (xyz).

Or, referring to FIG. 12, each of the pre-decoders 1900 provides the estimated channel vector and its received signals to a detector 2000a or a buffer 2000b according to a type of the channel vectors. Accordingly, desired symbols are first detected from signals transmitted through antenna elements of one same constituent unit in a transmitter, other symbols are later detected from others, stored by the buffer 2000b, transmitted through antenna elements of another same constituent unit therein. For example, the detector 2000a detects desired symbols x0, x1, y0, and y1, which combines into respective symbols x and y in the maximum, using the provided channel vectors and their received signals. The detector 2000a provides the symbols x and y to the buffers 2000b. Thereafter, the detector 2000a detects symbols z0 and z1 from signals which are stored by the buffer 2000b, which combines into a symbol z in the maximum ratio. The z is directly provided to the multiplexer 2100 with the x and y without being stored by a buffer. The multiplexer 2100 multiplexes the x, y, and z as one symbol sequence (xyz).

The construction of FIGS. 9, 10, 11, and 12 can be used in case that the number of transmission antennas is increased to 8, 10, and 12, respectively.

Figure 13:
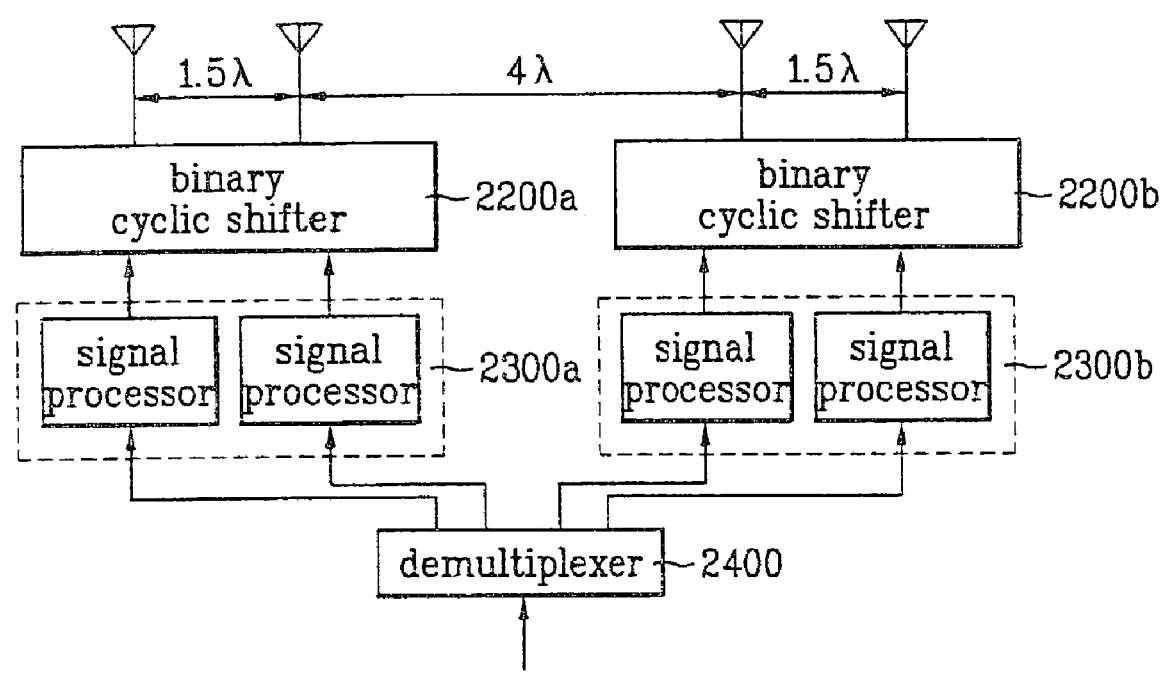
FIG. 13 is a diagram illustrating a transmitter (including four antenna elements) of a MIMO system according to a third embodiment of the present invention.

FIG. 13 is a diagram illustrating a transmitter (including four antenna elements) of a MIMO system according to a third embodiment of the present invention.

Figure 14:
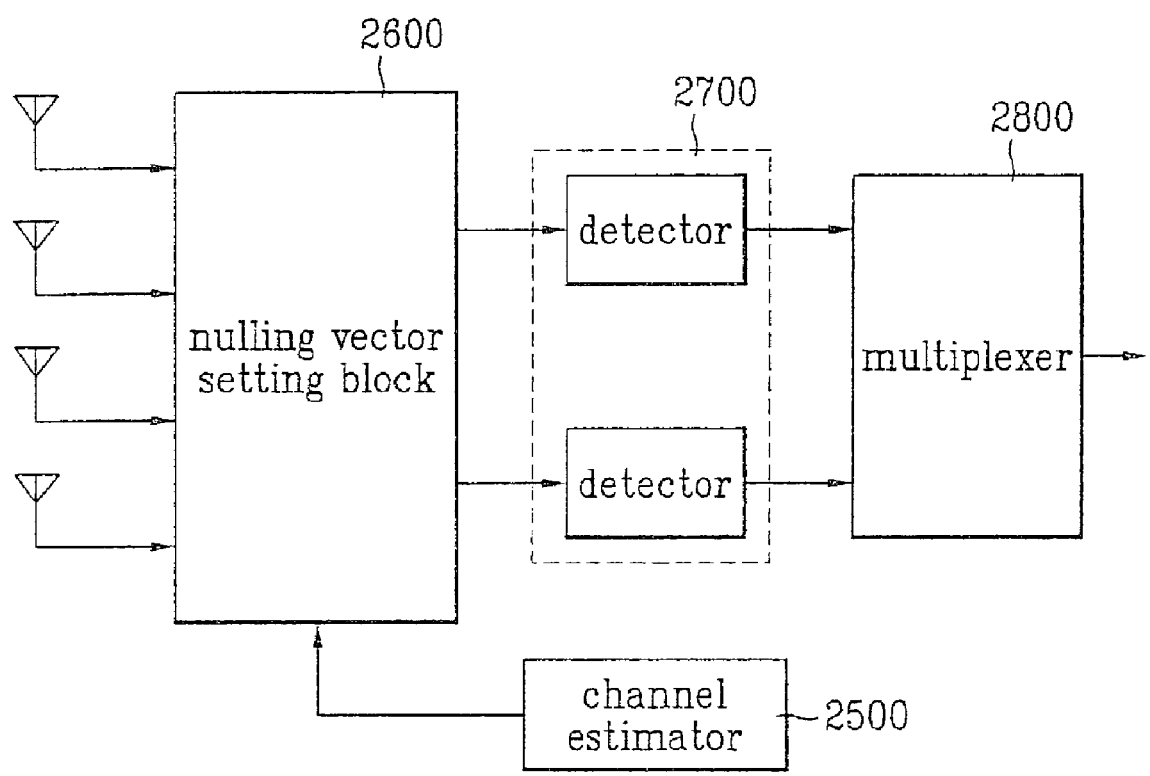
FIG. 14 is a diagram illustrating a first example of a receiver for receiving signals from the transmitter of FIG. 13.

FIG. 14 is a diagram illustrating a first example of a receiver for receiving signals from the transmitter of FIG. 13.

In FIGS. 13 and 14 is shown a case that the number of transmission antenna elements is the same as that of reception antennas, for example, four antenna elements are used in total. Also, a D-BLAST transmitter having at least two antenna elements is considered as a constituent unit, and such at least two constituent units constitute a V-BLAST system. That is, a plurality of antenna elements are divided into N constituent units according to locations of the plurality of antenna elements. Herein, a distance between any two antenna elements of each constituent unit is greater than 1.5 times of a wavelength of the transmitting signal. A distance between any two antenna elements that belongs to two constituent units, respectively, is greater than 4 times of a wavelength of the transmitting signal. For example, in FIGS. 6 and 7, the distance between the antenna elements in the D-BLAST system is 1.5λ in the same manner as the conventional system. Also, a D-BLAST transmitter is considered as a constituent unit of the V-BLAST MIMO system, and the antenna distance of a plurality of D-BLAST transmitters that constitute the V-BLAST MIMO system is 4λ in the same manner as the conventional system. That is, in case of arranging four antenna elements to implement the V-BLAST MIMO system, the conventional system requires 12λ, but the system according to the present invention requires 7λ only.

In FIG. 13, a transmitter uses a separate pilot channel for a data stream to be transmitted. The pilot channel are transmitted with a data channel of the data stream, its transmission chain is not shown.

Referring to FIG. 13, a demultiplexer 2400 divides a data stream into M sub-data streams and provides the divided sub-data streams to signal processors 2300a and 2300b. At this time, a signal processor 2300a or 2300b is provided with at least two sub-data streams including same information. The two signal processors 2300a and 2300b arranged in parallel encode and modulate the sub-data streams.

A binary cyclic shifter 2200a or 2200b periodically connects the M/2 modulated signals in the same D-BLAST constituent unit to the respective antenna elements to transmit the sub-data streams to the receiver. For example, the shifter 2200a or 2200b shifts the M/2 modulated signals to the at least two antenna elements of the same D-BLAST constituent unit per 1 symbol interval. Therefore, the M/2 modulated signals in the same D-BLAST constituent unit includes same information and different transmission delays. The receiver recognizes that a received signal is transmitted through which antenna element. The receiver also estimates a channel condition based on a channel vector of the pilot channel. It also applies a nulling vector from the channel vector to a received signal resulting in removing an interference and transmission noise the received signal includes.

FIG. 14 is a diagram illustrating a first example of a receiver for receiving signals from the transmitter of FIG. 13.

Referring to FIG. 14, a channel estimator 2500 estimates respective channel vectors of pilot signals which are transmitted with the received signals. Nulling vectors of the estimated channel vectors are set to detectors 2700 to null undesired symbols respectively. The setting process is performed by a nulling vector-setting block 2600. For example, where the channel vectors estimated by the channel estimator 2500 is designated by "H", the nulling vector-setting block 2600 calculates a pseudo inverse value "H$^+$" of "H" using a zero-forcing method or an MMSE (Minimum Mean Square Equation) method. And, it sets "H$^+$" to one of the detectors 2700. Likewise, another "H" is set to another of the detectors 2700. Accordingly, one of the detectors 2700 applies the set "H$^+$" to "SH", herein "S" designates a received signal. As a result, desired symbols "S" may be obtained. The nulling vector-setting block 2600 provides channel vectors obtained from signals of a same constituent unit and their nulling vectors to a same detector. That is, the nulling vector-setting block 2600 provides channel vectors and their nulling vectors to different detectors according to a type of the channel vectors. The receiver has the detectors 2700 corresponding to a number of the constituent units of the transmitter. For example, one of the detectors 2700 detects desired symbols x0 and x1, another of the detectors 2700 detects desired symbols y0 and y1. The former outputs x, into which x0 and x1 combine in the maximum ratio, the latter outputs y, into which y0 and y1 combine in the maximum ratio. A multiplexer 2800 multiplexes the symbols x and y as one symbol (xy).

Figure 15:
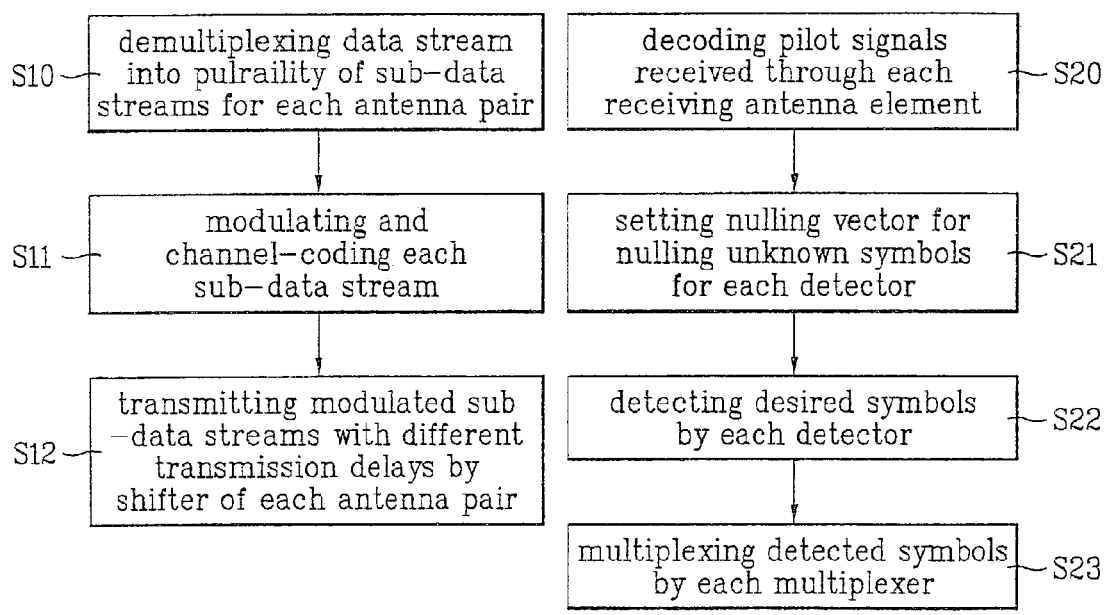
FIG. 15 is a flowchart illustrating a first example of a receiver for receiving signals from the transmitter of FIG. 13.

FIG. 15 is a flowchart illustrating a first example of a receiver for receiving signals from the transmitter of FIG. 13.

Referring to FIG. 15, the demultiplexer 2400 de-multiplexes a plurality of sub-data streams including same information for each of same constituent units (S10). The signal processors 2300a and 2300b channel-encode and modulate each of the sub-data streams (S11).

Each of the binary cyclic shifters 2200a and 2200b shifts the modulated signals at every one symbol delay to transmit the sub-data streams with different transmission delays for the same D-BLAST constituent unit to the receiver. A channel estimator 2500 of the receiver decodes M pilot signals received through receiving antenna elements. That is, the channel estimator 2500 obtains M channel vectors.

The nulling vector-setting vector 2600 sets a nulling vector of the obtained channel vector to one of the detectors 2700 to null undesired symbols. As mentioned above, the nulling vector is a pseudo inverse of the obtained channel vector according to the zero-forcing method or MMSE method. The one detector applies the nulling vector to the received signal and detects desired symbols (x0 x1) or (y0 y1), wherein each of the two pair symbols (x0 x1) and (y0 y1) has different transmission delays for a same constituent unit. Also, the one detector outputs x, into which x0 and x1 combines in the maximum ratio, another detector outputs y, into which y0 and y1 combines in the maximum ratio.

Figure 16A:
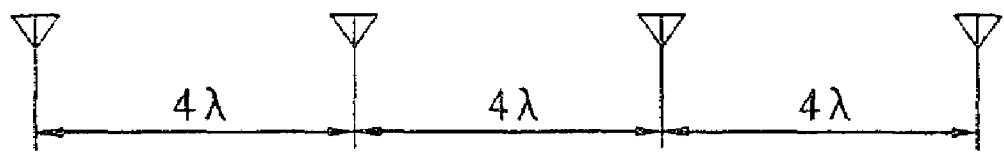
FIG. 16A is a diagram illustrating a co-polarized structure of a general V-BLAST.
Figure 16B:
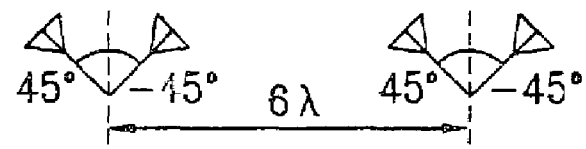
FIG. 16B is a diagram illustrating a dual-polarized structure of a general V-BLAST.
Figure 16C:
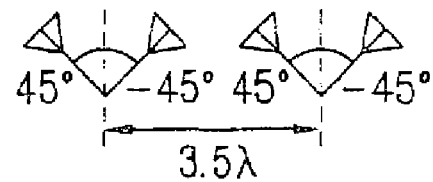
FIG. 16C is a diagram illustrating the dual-polarized structure in a hybrid MIMO system according to a fourth embodiment of the present invention.

The construction where a polarization diversity is applied in a hybrid MIMO system proposed according to the third embodiment of the present invention is illustrated in FIGs. 16A to 16C in comparison to the conventional technique.

That is, the third embodiment of the present invention proposes the construction where the polarization diversity is applied to the hybrid MIMO system supporting an open loop.

Generally, the polarization diversity is classified into a co-polarized structure and a dual-polarized structure. The former transmits the same polarized waves (for example, vertical polarized waves) through the respective antennas, and the latter transmits polarized waves having different vertical components through the two antennas (for example, a vertical polarized wave through the first antenna, and horizontal polarized wave through the second antenna, and at this time, the first and second antennas are tilted by 45° and −45°, respectively).

FIG. 16A is a view illustrating a co-polarized structure of a general V-BLAST.

Herein, in order to reduce the distance between the antennas, the signal is transmitted with 80% of the transmission capacity when there is no correlation, and the distance between the antennas is reduced from 10λ to 4λ instead. Accordingly, a space of 6λ in total is required for arranging four transmission antennas, and thus a denser antenna structure can be achieved in comparison to the structure using only the space diversity.

FIG. 16B is a view illustrating a dual-polarized structure of a general V-BLAST.

Herein, a space of 6λ in total is required for arranging four transmission antennas, and thus a denser antenna structure can be achieved in comparison to the structure using only the space diversity.

FIGS. 6 and 13 are diagrams illustrating the co-polarized structure in a hybrid MIMO system.

Herein, according to the transmission characteristic (each pair of antennas transmit the same signal, and one of them transmits the signal with one symbol delay), each pair has the antenna distance of 1.5λ, and the distance between the pairs is 4λ. Thus a space of 7λ is used for the construction of four antennas.

FIG. 16C is a view illustrating the dual-polarized structure in a hybrid MIMO system according to a fourth embodiment of the present invention.

In FIG. 16C, the antennas in the same D-BLAST unit are arranged at the same intervals, and transmit the signals having different transmission delay times and different phases (in the present invention, vertical polarized wave that transmits mutually orthogonal signals). Also, the antennas in the same D-BLAST unit are arranged with a tilt of 45° centering around a reference axis.

At this time, it is sufficient that the whole length where the same D-BLAST unit is arranged is determined to be ½ of the whole length (i.e., 3.5λ) when the antennas in the same D-BLAST unit transmit the same phase signal (for example, 7λ).

Accordingly, the antennas may be arranged at the minimum intervals or at longer intervals for a better transmission ratio. Specifically, each pair of antennas has the transmitter structure for the simplest D-BLAST, and the whole pairs constitute the V-BLAST transmitter structure.

Also, in addition to the density of the antenna array space, the polarization diversity provides other advantages in that it provides a reception gain in combination with the space diversity if the radio channel has a high spatial correlation.

Thus, in a weak condition of the MIMO system, it serves to reduce the deterioration of the transmission capacity.

As described above, the present invention has the following effects.

First, using the composite system of D-BLAST and V-BLAST, the antenna distance is greatly reduced and the frequency efficiency becomes better in comparison to the widely used V-BLAST system.

Second, using the polarization diversity, a denser system can be constructed to reduce the base station antenna array distance by 50%.

Third, the deterioration degree of the basic performance of the MIMO system that is produced when the channel condition is changed from the non-correlation condition to the correlation condition due to the change of the channel continuously changed can be mitigated through the receiving gain obtained from the effect of the diversity.

Fourth, by reflecting the channel environment continuously changed, the deterioration degree of the basic performance of the MIMO system that is produced when the channel condition is changed from the non-correlation condition to the correlation condition due to the change of the channel continuously changed can be mitigated through the construction of a closed loop and proper power allocation, and at the worst, it can be known that the performance becomes identical to that of the phased array system.

Fifth, as the correlation of the channels becomes greater, the performance deterioration can be greater offset in comparison to the open loop system.

It will be apparent to those skilled in the art than various modifications and variations can be made in the present invention. Thus, it is intended that the present invention covers the modifications and variations of this invention provided they come within the scope of the appended claims and their equivalents.

What is claimed is:

1. A method for transmitting signals in a multiple-input multiple-output communication system provided with a plurality of antennas, comprising:
    dividing the plurality of antennas in a transmitter into N antenna groups according to locations of the plurality of antennas, wherein the antennas are placed by having at least one distance among the antennas;
    splitting a data stream into N sub-data streams, wherein each of the N sub-data streams includes antenna identifiers for a corresponding antenna group of the N antenna groups and the antenna identifier is used for a sequence of pilot symbols with a prescribed pattern; and
    transmitting an $i_{th}$ sub-data stream of the N sub-data streams to a receiver through each of the antennas included in an $i_{th}$ antenna group of the N antenna groups with different transmission delays for i=1, 2, . . . , and N.

2. The method of claim 1, further comprising shifting the $i_{th}$ sub-data stream of the N sub-data streams to each antenna included in the $i_{th}$ group of the N antenna groups before the transmitting.

3. The method of claim 1, wherein the $i_{th}$ sub-data streams transmitted through each antenna included in the $i_{th}$ antenna group of the N antenna groups have at least one of different transmission delays and different phases.

4. A method for transmitting signals in a multiple-input multiple-output communication system provided with a plurality of antennas, comprising:
    dividing the plurality of antennas in a transmitter into N groups according to locations of the plurality of antennas;
    splitting a data stream into N sub-data streams and signal-processing the sub-data streams; and
    transmitting an $i_{th}$ processed sub-data stream of N processed sub-data streams to a receiver through each of the antennas included in an $i_{th}$ group of the N antenna groups with different transmission delays for i=1, 2, . . . , N, and transmitting antenna identifiers of the $i_{th}$ group of the N antenna groups through a separate channel.

5. The method of claim 4 further comprising shifting the $i_{th}$ processed sub-data stream of N processed sub-data streams to the each antenna included the $i_{th}$ group of the N antenna groups.

6. The method of claim 4, wherein the $i_{th}$ sub-data streams transmitted through each antenna included in the $i_{th}$ antenna group of the N antenna groups have at least one of different transmission delays and different phases.

7. An apparatus for transmitting signals in a multiple-input multiple-output communication system provided with a plurality of antennas, the apparatus comprising:
    N antenna groups into which the apparatus divides the plurality of antennas in a transmitter according to locations of the plurality of antennas;
    a demultiplexer for splitting a data stream into N sub-data streams, wherein each of the N sub-data streams includes antenna identifiers for a corresponding antenna group of the N antenna groups and the antenna identifier is used for a sequence of pilot symbols with a prescribed pattern; and
    a processor for signal-processing the N sub-data streams, wherein the apparatus transmits an $i_{th}$ processed sub-data stream of the N sub-data streams to a receiver through each of the antennas included in an $i_{th}$ antenna group of the N antenna groups with different transmission delays for i=1, 2, . . . , and N.

8. The apparatus of claim 7, further comprising a shifter for shifting the $i_{th}$ processed sub-data streams of the N sub-data streams to the each of the antennas in the $i_{th}$ antenna group of the N antenna groups.

9. The apparatus of claim 7, wherein the shifter shifting the $i_{th}$ processed sub-data stream of the N sub-data streams to the each of the antennas included in the $i_{th}$ group of the N antenna groups occurs at 1 symbol intervals.

10. An apparatus for transmitting signals in a multiple-input multiple-output communication system provided with a plurality of antennas, comprising:
    N antenna groups into which the apparatus divides the plurality of antennas in a transmitter according to locations of the plurality of antennas;
    a demultiplexer for dividing a data stream into N sub-data streams; and
    a processor for signal-processing the N sub-data streams, wherein the apparatus transmits an ith processed sub-data stream of the N processed sub-data streams to a receiver through each of the antennas included in an $i_{th}$ antenna group of the N antenna groups with different transmission delays for i=1, 2, . . . , N and transmits antenna identifiers of the $i_{th}$ antenna group of the N antenna groups through a separate channel.

11. The apparatus of claim 10, further comprising a shifter for shifting the $i_{th}$ processed sub-data streams of the N sub-data streams to each antenna included in the $i_{th}$ antenna group of the N antenna groups.

12. The apparatus of claim 10, wherein the $i_{th}$ sub-data streams transmitted through each antenna includede in the $i_{th}$ group of the N antenna groups have at least one of different transmission delays and different phases.

13. A method for transmitting signals in a multiple-input multiple-output communication system provided with a plurality of antennas, comprising:
    dividing the plurality of antennas in a transmitter into antenna groups according to locations of the plurality of antennas, wherein the antennas are placed by having at least one distance among the antennas;
    splitting a data stream into sub-data streams, wherein the sub-data streams include at least one antenna identifier for a corresponding antenna group of the antenna groups and the antenna identifier is used for a sequence of pilot symbols with a prescribed pattern; and
    transmitting a sub-data stream of the sub-data streams to a receiver through at least one antenna includede in the corresponding antenna group of the antenna groups with different transmission delays.

14. The method of claim 13, further comprising shifting the sub-data stream of the sub-data streams to each antenna included in corresponding antenna group of the antenna groups before the transmitting.

15. The method of claim 13, wherein the sub-data stream transmitted through each antenna included in the corresponding antenna group of the antenna groups have at least one of different transmission delays and different phases.

16. A method for transmitting signals in a multiple-input multiple-output communication system provided with a plurality of antennas, comprising:
dividing the plurality of antennas in a transmitter into antenna groups according to locations of the plurality of antennas;
splitting a data stream into sub-data streams and signal-processing the sub-data streams; and
transmitting a processed sub-data stream of the processed sub-data streams to a receiver through at least one antenna included in a corresponding antenna group of the antenna groups with different transmission delays and transmitting at least one antenna identifier for the corresponding antenna group of the antenna groups through a separate channel.

17. The method of claim 16, wherein the antenna identifier is used for a sequence of pilot symbols with a prescribed pattern.

* * * * *